United States Patent [19]

Takarada

[11] 3,854,103
[45] Dec. 10, 1974

[54] INDEPENDENTLY VARIABLE ON-TIME AND OFF-TIME PULSE GENERATOR CIRCUIT

[76] Inventor: Eiichi Takarada, 1423 Vassar Rd., Rockford, Ill. 61058

[22] Filed: Nov. 6, 1973

[21] Appl. No.: 413,230

[52] U.S. Cl.................... 331/55, 307/260, 307/265, 307/290, 328/58, 331/56, 331/74, 331/173
[51] Int. Cl........................... H03b 3/10, H03k 5/04
[58] Field of Search......... 331/111, 113, 46, 55, 56, 331/74, 173; 307/205, 283, 279, 290, 260; 328/58

[56] References Cited
UNITED STATES PATENTS

| | | | |
|---|---|---|---|
| 3,125,730 | 3/1964 | Levy et al. | 307/265 |
| 3,259,854 | 7/1966 | Marcus et al. | 307/283 |
| 3,388,346 | 6/1968 | Roof et al. | 307/265 |
| 3,414,739 | 12/1968 | Paidosh | 307/283 |
| 3,611,204 | 10/1971 | Boenning et al. | 307/265 |
| 3,629,710 | 12/1971 | Durland | 307/265 |
| 3,697,879 | 10/1972 | Holliday | 307/265 |

*Primary Examiner*—Stanley D. Miller, Jr.

[57] ABSTRACT

A pulse generator for use in an EDM power supply or the like wherein the pulse-on time and pulse-off time are each adjustable, substantially independently of the other. The circuit contains a pair of relaxation oscillators, one of which is associated with the on-time and one with the off-time of the output pulse train. The timed signals produced by the oscillators are shaped by respective Schmidt triggers for controlling a flip-flop which thereby generates the output pulse train. The flip-flop outputs are fed back to the oscillator inputs so as to allow only one of such oscillators to be active at any given time thereby allowing the on-period and off-period to be each independently timed.

4 Claims, 3 Drawing Figures

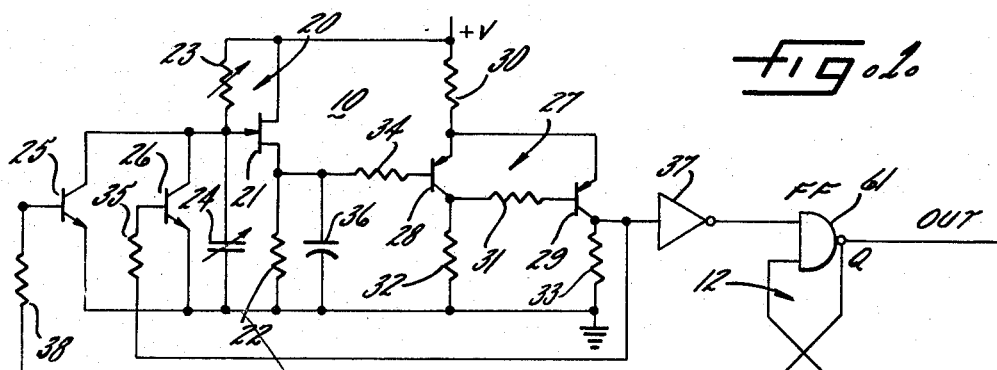
Fig. 2a.
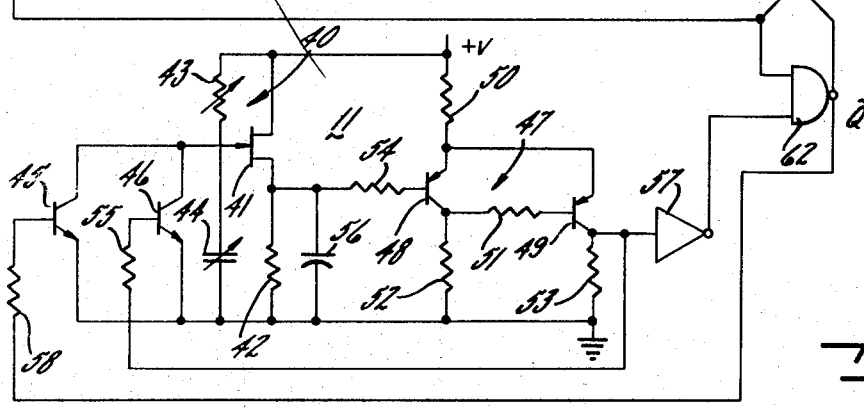
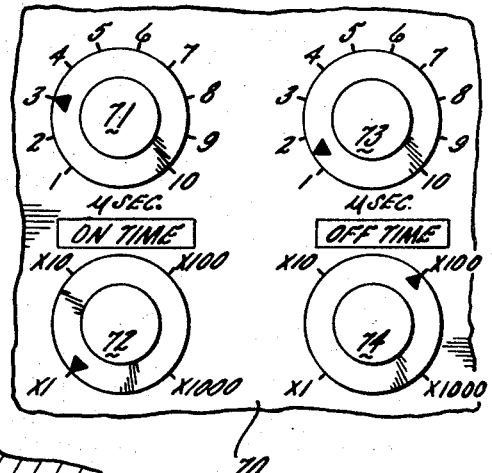
Fig. 2b.
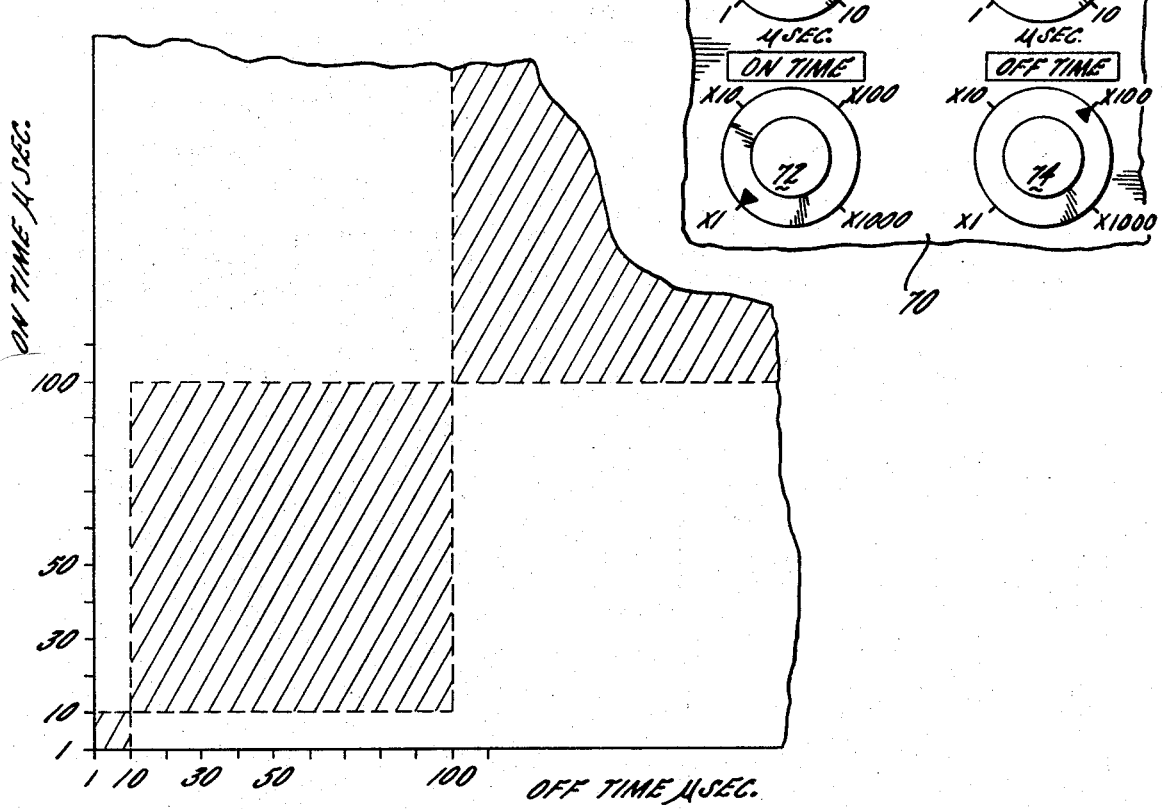
Fig. 3.

INDEPENDENTLY VARIABLE ON-TIME AND OFF-TIME PULSE GENERATOR CIRCUIT

This invention generally relates to electrical discharge machining, that is, the machining of metal or other conductive materials by the utilization of electrical discharge between a workpiece and a tool electrode. More specifically, the invention relates to improvements in the power supply for such a device wherein the spark on and off times are independently adjustable.

In electrical discharge machining, which is sometimes referred to as spark machining or electro-erosion, particles are dislodged from a conductive workpiece by electrical discharges or sparks which are passed through an ionized gap which is defined between a shaped electrode tool and an electrically conductive workpiece. The general rule is that each discharge will occur between the most closely spaced electrode and workpiece points, and, therefore, to obtain the desired machined configuration for the workpiece in a minimum amount of time one or more successive electrodes, each shaped to contribute to the formation of a complementary configuration, are commonly employed. The size of the particle dislodged by the respective discharges at each electrode, is dependent upon both the composition of the workpiece and the energy content of the discharge. Provision is therefore generally made to control the discharge energy, such as by varying one or more of the discharge repetition rate, duty cycle, or current level.

Further, modern EDM equipment generally employs power switches of the electronic type for coupling power, from a source, across the machining gap in a series of discrete pulses. As mentioned above, both the pulse repetition rate and duty cycle are important factors in controlling the energy content of the discharge and thereby the size of the particle dislodged by each discharge. In other words, both the pulse on-time and off-time must be accurately controlled. In addition, in order to provide a system which is adaptable to a variety of machining conditions, a wide range of adjustment of on-time and off-time should be provided.

A stable pulse generator having an adjustable pulse on-time and off-time is generally employed to provide this control. The generator output is ultimately used to drive the power switches thereby providing the necessary control over the energy content of each discharge.

The pulse generator circuits which have been utilized in certain prior art EDM systems have generally taken the form of the typical astable multivibrator. These circuits, while being adjustable over the necessary frequency range, are limited in that they optimally operate in a symmetrical mode, i.e., at 50 percent duty cycle. While the duty cycle can be made adjustable over a certain range, that range is limited in that the on-time and off-time are not completely independent.

A typical astable multivibrator is comprised of a pair of grounded emitter transistors, each of which has its base circuit cross coupled, via a capacitor, to the collector circuit of the other. The base circuit of each transistor is provided with a bias supply capable of causing the transistor to conduct, but which can be overcome by a sufficient charge on its base circuit capacitor. In practice, the capacitor in the base circuit of a first transistor is charged while that transistor is conducting, the second transistor being cut off by the charge on its base circuit capacitor. However, when the charge on the base circuit capacitor of the second transistor is drained, it begins to conduct. The charge on the capacitor in the base circuit of the first transistor then causes the first transistor to turn off for a time sufficient to discharge that capacitor. In the meantime, the capacitor in the base circuit of the second transistor is charging. Therefore it is seen that the operation of the circuit is somewhat interdependent in that while one capacitor is discharging to maintain its associated transistor non-conducting the second capacitor is charging in preparation for the next cycle. If the on time of one transistor is made substantially disproportionate to that of the second transistor, the result is the failure of the capacitor in the base circuit of the shorter conducting transistor to fully charge. It should be appreciated that this will prevent the turning off of the second transistor for its full design period. This results in a pulse train output from the multivibrator which is not responsive to that demanded by the control settings.

In addition to the limitations discussed above, an astable multivibrator when operated in a substantially non-symmetrical mode, has difficulty in achieving a fast transition time at the output of the longer conducting transistor. It should be appreciated that this is a limiting factor in switching systems such as EDM power supplies wherein fast turn-on and turn-off are highly desirable.

With the foregoing in mind, it is a general object of the present invention to provide a pulse generator for use in an EDM power supply or the like wherein the on-time and off-time of the pulse train output are adjustable, substantially independently of each other. Another object is to provide a pulse generator of the foregoing type for supplying a train of pulses characterized by very fast rise and fall times.

A more specific object is to provide a pulse generator of the foregoing type wherein the on-time and off-time are separately controlled by individual timing oscillators. Further, as a related object it is intended to provide means within the pulse generator circuit for enabling only one of such timing oscillators at any given time.

These and other objects and advantages of the present invention will become apparent from the following detailed description when taken in conjunction with the accompanying drawings in which:

FIG. 1 is a circuit diagram for a pulse generator constructed in accordance with the present invention;

FIG. 2 is an illustrative control panel for adjusting the on-time and off-time of the pulse train output from the circuit of FIG. 1;

FIG. 3 is a plot of on-time versus off-time illustrating the range of on-time to off-time available both in the prior art and in the circuit of FIG. 1.

While the invention will be described in connection with a preferred embodiment, it will be understood that it is not intended to limit it to that embodiment. To the contrary, the intent is to cover all alternatives, modifications and equivalents as may be included within the spirit and scope of the invention as defined by the appended claims.

Turning now to the drawings, a pulse generator constructed in accordance with the teachings of the present invention is shown containing an off-time generator 10, an on-time generator 11 and an output flip-flop 12. While only the off-time generator 10 will be described in detail, it should be realized that the on-time generator 11 is a duplicate circuit.

Referring then to FIG. 1, a relaxation oscillator, generally indicated at 20, forms the timing element for off-time generator 10. Variable resistor 23 and variable capacitor 24 are series connected across the DC supply with their junction coupled to the gate of field effect transistor (FET) 21. The FET is arranged in a circuit commonly known as a source follower, with its drain coupled to the positive DC supply and its source coupled through resistor 22 to circuit common. The circuit, having an extremely high input impedance and a relatively low output impedance, effectively isolates the timing components (resistor 23 and capacitor 24) from the pulse shaping circuitry to be described below. Further, the source of FET 21 is coupled to the input of a Schmidt trigger generally indicated at 27. The output of the Schmidt trigger, taken at the collector of transistor 29, is coupled via resistor 35 to the base of transistor 26, which is in turn connected in shunting relationship across capacitor 24.

The operation of the timing circuit will now be described. When power is initially applied, there is no charge on capacitor 24 and the drain of FET 21 is at a correspondingly low level. Capacitor 24 begins to charge through resistor 23 at a rate determined by the values of the resistance and capacitance. Because of the source follower configuration, the voltage at the source of FET 21 follows the voltage on capacitor 24. When this voltage exceeds the threshold level of Schmidt trigger 27, in a manner to be described below, the trigger output (taken at the collector of transistor 29) rapidly switches from a low to a high level. This high signal, being applied to the base of transistor 26, causes conduction in that transistor, rapidly discharging capacitor 24. The voltage at the source of FET 21, following the voltage on capacitor 24, also drops to a low level, further causing the output of the Schmidt trigger to return to a low level. This removes the base drive from transistor 26, allowing capacitor 24 to again begin charging, initiating another timing cycle. It should therefore be appreciated that the circuitry thus far described produces a series of timed waveforms at the source terminal of FET 21, the period thereof accurately controllable by the values of resistor 23 and capacitor 24.

As described above, the output of relaxation oscillator 20 is coupled from the source terminal of FET 21 to a Schmidt trigger generally indicated at 27. A Schmidt trigger may be defined as a voltage level sensitive switching device utilizing regenerative feedback to cause a rapid transition in its output signal in response to its input signal crossing a threshold level. The switching time of the output signal is thereby made substantially independent of the wave shape of the input signal. More specifically, when the input signal is above the threshold level, the Schmidt trigger output is at a high level, and when the input falls below the threshold the Schmidt trigger output rapidly falls to 0.

Schmidt trigger 27 includes a pair of PNP transistors 28, 29 sharing a common emitter resistor 30 coupled between their emitters and a suitable supply of DC voltage. The collector of transistor 28 is coupled through resistor 31 to the base of transistor 29 and also through resistor 32 to the circuit common. The collector of transistor 29, which serves as the output terminal, is coupled via resistor 33 to the circuit common. The base of the transistor 28, which forms the input for the Schmidt trigger, is coupled via resistor 34 to the source terminal of FET 21.

The operation of the circuit is as follows. It is recalled that the signal at the source terminal of FET 21 is a slowly rising voltage, corresponding to the voltage buildup on capacitor 24. When this level is below the threshold voltage of the Schmidt trigger, the base-emitter junction of transistor 28 is forward biased current flow occurring through resistors 30, 34 and 22. This current flow causes transistor 28 to conduct, thereby preventing conduction in transistor 29. Thus, the collector of transistor 29, which is the output of the circuit, appears as a logic zero or ground.

However, when the threshold is exceeded base current to transistor 28 is interrupted, thereby causing it to begin turning off. As the voltage on the collector of transistor 28 starts to drop, base current begins flowing in transistor 29. Since this base current causes transistor 29 to conduct and current to flow through resistor 30, the voltage at the common emitters of transistors 28 and 29 drops thereby reverse biasing the base emitter junction of transistor 28, driving it further into cut-off. In addition, the conduction of transistor 29 causes the collector thereof to be driven high, appearing as a logic one.

It is recalled that this positive voltage at the collector of transistor 29 causes transistor 26 to discharge capacitor 24, rapidly dropping the voltage at the source terminal of FET 21. The voltage will reach a point at which transistor 28 will again begin to conduct. The collector current of transistor 28 flowing through resistor 32 will cause the collector of transistor 28 to be driven to a higher level removing the source of base current for transistor 29. Transistor 29 will begin to go into cut-off, reducing the current drawn through resistor 30, further forward biasing the base emitter junction of transistor 28. Transistor 28 is quickly driven into saturation, as before, clamping transistor 29 in cut-off. As described above, when transistor 29 is turned off, its collector voltage reflects a logic zero.

It should be appreciated from the foregoing that the switching of the Schmidt trigger occurs at a very rapid rate once the input voltage crosses its threshold. It is therefore seen that what is accomplished is the production of a relatively brief positive pulse at the output of the Schmidt trigger each time the charge on capacitor 24 causes its threshold level to be exceeded. These timing pulses are initiated when the threshold is exceeded and are terminated almost immediately thereafter by the response of transistor 26 to the pulse. To this end, a local feedback circuit including resistor 35 is connected between the collector of terminator 29 and the base of transistor 26. In addition, capacitor 36 is coupled across the Schmidt trigger input to provide a small amount of hysteresis to insure the discharge of capacitor 24. Stated more specifically, capacitor 36, which is charged by the rising signal at the source terminal of the FET, must discharge through resistor 34 and the base-emitter circuit of transistor 28, thereby providing a brief additional on-time for the Schmidt trigger, allowing transistor 26 to completely discharge capacitor 24.

In practicing the invention, the two timing generators 10 and 11 are arranged so that the off-time generator is disabled while the on-time generator times the on-period, and the on-time generator is disabled while the off-time generator times the off-period.

To this end, it should be remembered that the on-time generator 11 is, as previously noted, both structurally and operationally identical to the off-time generator described above.

To obtain the desired train of output pulses, the output of the off-time generator 10, derived at the collector of transistor 29, is coupled via an inverter 37 to the input of a flip-flop which is generally indicated at 12. Similarly, the output of the on-time generator 11, which is derived at the collector of transistor 49, is coupled via inverter 57 to the complementary input of flip-flop 12. Flip-flop 12 is seen to be composed of a pair of cross-coupled NAND gates 61, 62. Each gate has one of its inputs coupled to the output of the opposite gate. The second input of gate 61, which can be termed the set input, is coupled to the output of inverter 37. The second input of gate 62, which can be termed the reset input, is coupled to the output of inverter 57. The output of gate 61 may be termed the Q output while that of gate 62 may be termed the $\overline{Q}$ output.

It is recalled that the inputs to inverters 37 and 57 are normally maintained at a low level except in the presence of a timing pulse. Therefore it is seen that the set and reset inputs of flip-flop 12 are normally maintained at a high level. If, for example, a timing pulse is emitted by the off-time generator, it will be inverted by inverter 37 and appear as a logic 0 at the set input of flip-flop 12. This low input will cause the Q output to go high, which when cross coupled to the input of gate 62, in conjunction with the high signal from inverter 57, causes the $\overline{Q}$ output to go low. Similarly, a timing signal emitted by the on-time generator, when inverted by inverter 57 causes the $\overline{Q}$ output to go high and the Q output to go low. It is therefore seen that a succession of timing pulses emitted by the on-time and off-time generators produces a square wave both at the Q and $\overline{Q}$ outputs of the flip-flop. The Q output may be taken as the output of the pulse generator, with the high portions of the signal corresponding to power switch on-time and the low portions corresponding to power switch off-time.

In accordance with the invention, the on-time and off-time generators are operated substantially independently of each other, so as to improve the duty cycle available from the pulse generator. To accomplish this, the Q output is coupled via resistor 38 to the base of transistor 25. Transistor 25 is connected in shorting relationship across capacitor 24. It is therefore seen than when base current is supplied to transistor 25, it will be caused to conduct preventing the charging of capacitor 24 and thereby disabling off-time generator 10. Similarly, the $\overline{Q}$ output of flip-flop 12 is coupled via resistor 58 to the base of transistor 45, which is in turn connected in shorting relationship across capacitor 44. Thus, when base current is supplied to transistor 45 on-time generator 11 is disabled.

The circuit operates in the following way. Assuming initially that the Q output of flip-flop 12 is low and the $\overline{Q}$ output is high (defined above as off-time), it is seen that base current is provided to transistor 45 via resistor 58 disabling the on-time generator. Transistor 25 has no supply of base current, as the Q output is low, and transistor 26 has no supply of base current, as the collector of transistor 29 is low. Therefore capacitor 24 is allowed to charge through resistor 23. When the voltage at the source of FET 21 exceeds the Schmidt trigger threshold, a brief positive pulse will be produced at the collector of transistor 29. This high signal acting through transistor 26 will completely discharge capacitor 24. In addition, the high signal acting through inverter 27 will also set flip-flop 12, causing the Q output to go high and the $\overline{Q}$ output to go low. This, as described above, initiates the power switch on-time. In addition, the Q output going high supplies base current to transistor 25 which disables off-time generator 10. The $\overline{Q}$ output going low, removes the supply of base current from transistor 45, thereby allowing capacitor 44 to initiate its charge cycle through resistor 43. When the voltage at the source terminal of FET 41 exceeds the threshold of Schmidt trigger 47, the on-time will be terminated by the Schmidt trigger, producing a positive pulse at the collector of transistor 49. This pulse, acting through transistor 46, will discharge capacitor 44; in addition, the same pulse acting through inverter 57 will reset flip-flop 12 terminating the on-time and initiating the off-time. The $\overline{Q}$ output going high disables on-time generator 11, while the Q output going low enables off-time generator 10. In this way, the on-time and off-time generators are alternately operated with the non-operating generator being disabled in preparation for its operating cycle. In addition, the means for disabling the non-operating generator (i.e., the transistor connected in shorting relationship across its timing capacitor) assures rapid discharge of that capacitor, thereby requiring only a brief instant to prepare the generator for its next cycle.

It should be appreciated that the arrangement described above allows the timing generators to operate substantially independently of each other. For example, when the on-period is initiated, control is switched to oscillator 40 and its timing components while capacitor 24 is also instantaneously discharged preparing the off-time generator for operation. The timing components are not interrelated as in the prior art means described above, with the attendant duty cycle limitation.

As can be appreciated from the foregoing, the on-time of the output pulse train is determined completely by on-time generator 11, and more specifically by the settings of resistor 43 and capacitor 44. It is seen that these component values determine the time elapsed between initiation of the timing period of the on-time generator and the timing pulse emitted thereby. As the aforementioned pulse resets flip-flop 12, it is apparent that the on-time of the output waveform is terminated upon occurrence of the pulse, and further that the off-time period is initiated thereby. Similarly, the off-time is determined by the settings of resistor 23 and capacitor 24, which are coupled in the gate circuit of FET 21. Capacitor 24 is allowed to begin charging at the initiation of the off-time (when the Q output goes low) and will again drive the Q output high with a brief positive pulse at the end of its timing period. It is further seen that during this period the on-time generator is disabled, being again enabled by the aforementioned flip-flop transition.

FIG. 2 shows an exemplary control panel which may be used in conjunction with the circuit of FIG. 1. The control panel 70 includes an on-time control 71, calibrated in microseconds, and having a range from 1 to 10. That range is extended by on-time multiplier 72, which multiplies the basic periods set on control 71, by a factor of one, ten, one hundred or one thousand depending on its setting. Similarly, off-time control 73 and multiplier 74 are provided to independently adjust the off-time.

The on-time controls 71, 72 are used to adjust the period of oscillator 40 in the on-time generator by setting the values of resistor 43 and capacitor 44; for example control 71 may adjust the value of resistor 43 while control 72 may adjust the value of capacitor 44. Similarly the off-time controls 73, 74 are used to adjust the values of resistor 23 and capacitor 24 in oscillator circuit 20 of the off-time generator.

By way of contrast the prior art circuitry described above, could not provide such independent control. The foregoing material demonstrated that the output of the typical astable multivibrator could be made non-symmetrical only within certain limits. In order to restrain operation within those limits certain prior art devices would provide a modified form of control panel. They might, for example, provide an on-time control 71 and an independent off-time control 73. However, in order to confine operation within the aforementioned astable limitations, independent multipliers 72 and 74 would not be provided, but would be replaced with a single multiplier which set the range for both controls 71 and 73. Thus, for example, if an on-time of 12 microseconds were required, the off-time would be restricted to the range of 10 to 100 microseconds. An off-time of, for example, 150 microseconds would not be achievable with an on-time of 12 microseconds in such a prior art device. This is illustrated in FIG. 3, which is a plot of on-time versus off-time in microseconds. The cross-hatched portions of that plot indicate the range of on-time, off-time adjustability which has heretofore been available in prior art devices. For example, if the on-time were chosen between 10 and 100 microseconds, the off-time would also be restricted to that range; off-time could not go below 10 microseconds nor above 100 microseconds. This is not the case with the pulse generator circuit of the present invention. To the contrary, the independently operable on-time and off-time generator taught herein enables operation over the entire area of the plot of FIG. 3, particularly when the exemplary control panel of FIG. 2 is employed. Thus, for example, an on-time of 3 microseconds might be selected by setting control 71 to 3 and control 72 to $x$ 1 as illustrated. At the same time, an off-time of any period, for example, 150 microseconds, might be selected by setting control 73 to 1.5 and control 74 to $x$ 100, also as shown. The increased duty cycle range thus available is readily apparent.

As a further feature of the present invention, means may be provided to exert control over the pulse generator via feedback signals derived, for example, from the machining gap. As will be apparent to one skilled in the art, the signals which are commonly generated in an EDM system, indicating various operational conditions, may be used to synchronize the pulse generator with those conditions. By way of example, such control might be used to initiate the on-cycle of the power switches only in the presence of a signal indicating the proper state of ionization in the gap, an isolated input to the base of transistor 25 being a convenient place to apply such signal.

In summary, it will be appreciated that what has been provided, is a pulse generator, for use in an EDM power supply or the like, wherein the pulse on-time and pulse off-time are independently adjustable. Not only is this independent adjustment available within a wide range of duty cycle, but the output waveform, being shaped by Schmidt triggers and coupled through a flip-flop, takes the form of a clean square wave, which is not degraded by non-symmetrical operation.

What is claimed is:

1. A pulse generator for controlling the on-time and off-time of the power switches in an EDM power supply comprising; an on-time generator and an off-time generator, each of said generators including a timing circuit having adjusting means for continuously varying the period of said timing circuits, a Schmidt trigger level detector responsive to the signal produced by said timing circuit, a field effect source follower circuit interposed for isolation between said Schmidt trigger and said timing circuit, discharge means associated with said timing circuit, said discharge means operating in response to the output of said Schmidt trigger; a bistable flip-flop circuit having first and second inputs and a pair of outputs, said first input of said flip-flop being coupled to the output of the Schmidt trigger of said off-time generator and said second input being coupled to the output of the Schmidt trigger of said on-time generator, said flip-flop being driven into a first stable state in response to the termination of the period of the on-time generator and a second stable state in response to the termination of the period of the off-time generator, a first means for disabling said on-time generator, a second means for disabling said off-time generator, the outputs of said flip-flop being coupled to said disabling means so that said on-time generator is disabled when said flip-flop is in its first stable state and said off-time generator is disabled when said flip-flop is in its second stable state, whereby the signal produced at the outputs of the flip-flop is a serial pulse train whose on-time period and off-time period are independently adjustable.

2. The pulse generator as recited in claim 1 wherein the first stable state of the flip-flop corresponds to the pulse train off-time and the second stable state to the pulse train on-time.

3. The pulse generator as recited in claim 2 wherein each timing circuit contains an associated timing capacitor, and the disabling means each comprise a switch coupled in shorting relationship across the associated timing capacitor.

4. The pulse generator as recited in claim 3 wherein each of the timing circuits comprise an independent relaxation oscillator.

* * * * *